2,775,930
HAY BALER

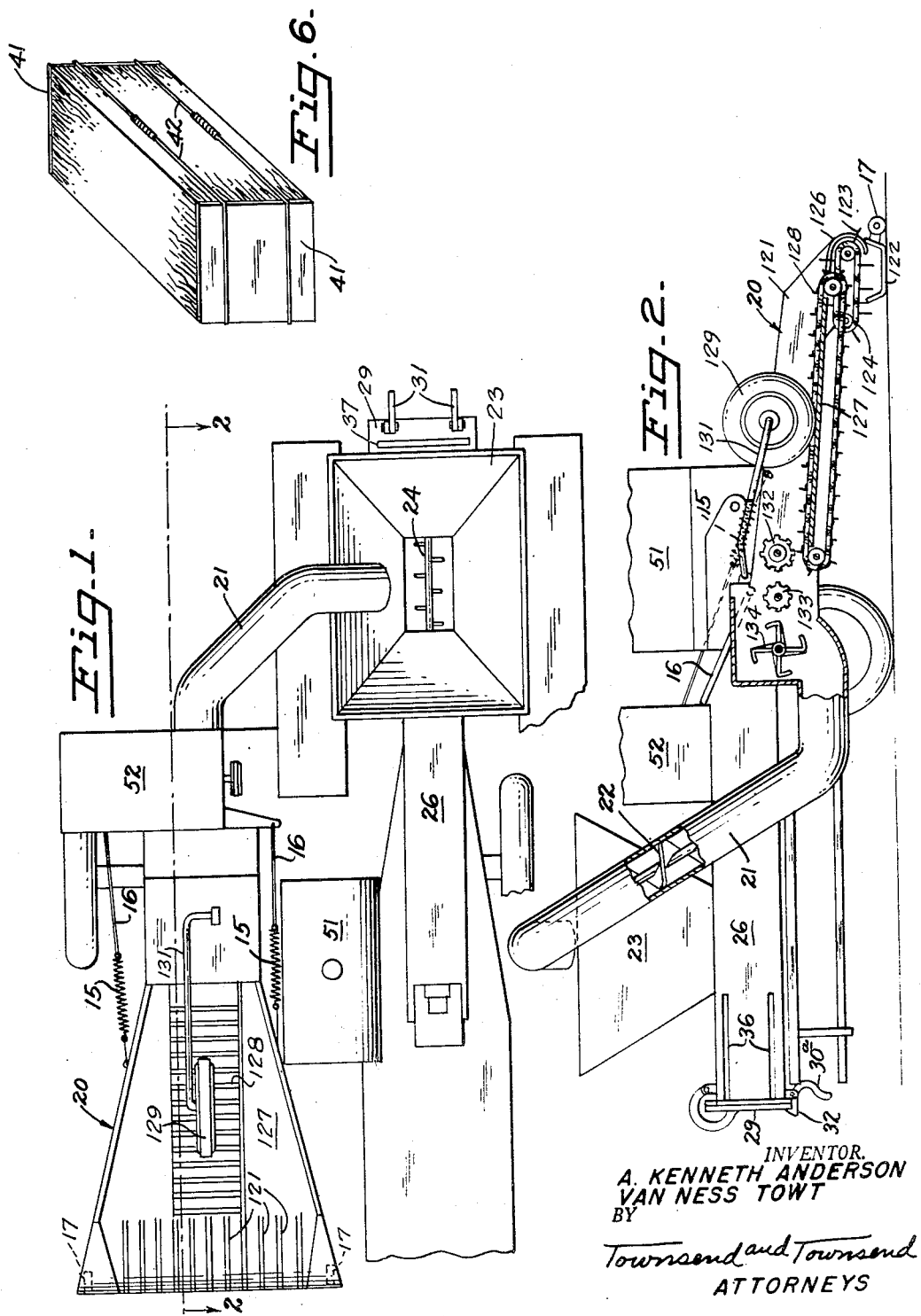

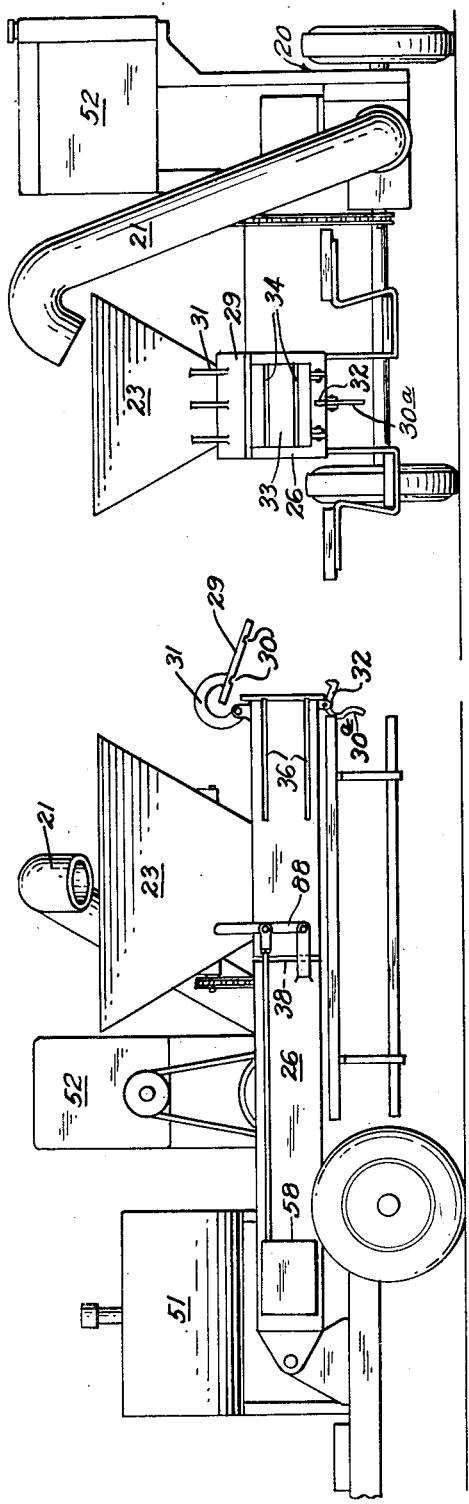
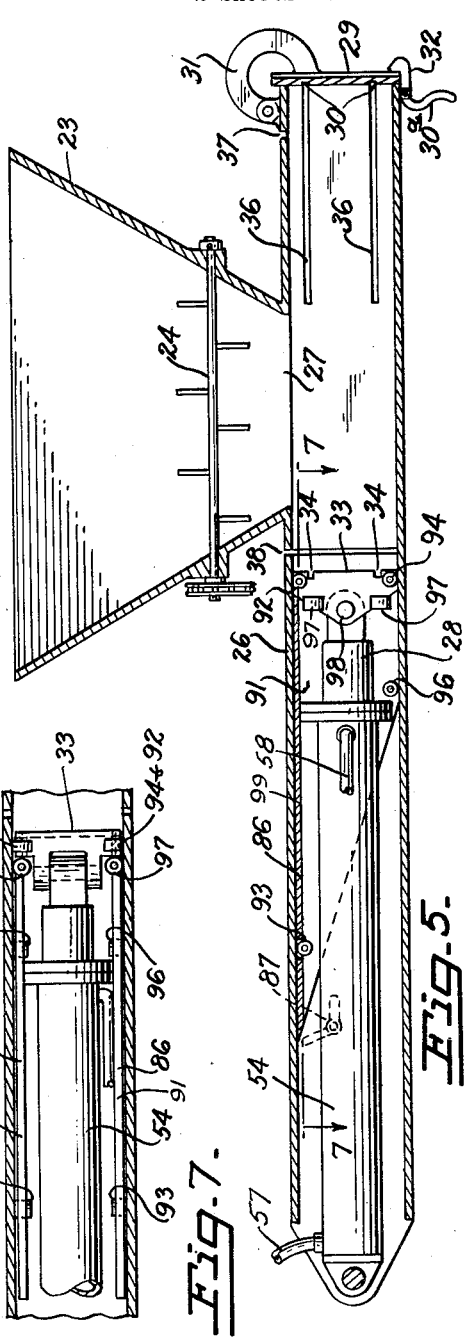

Andrew Kenneth Anderson and Van Ness Towt, Los Banos, Calif.

Application December 19, 1950, Serial No. 201,572

1 Claim. (Cl. 100—180)

This invention relates to a new and useful improvement in hay baler. More particularly, the invention relates to an integrated chopping and baling machine which may be tractor drawn or self-propelled to advance along a windrow of hay, alfalfa or similar material so as to pick the hay up off the ground, convey the same to a chopper, chop the hay to the required degree of fineness, convey the chopped hay to the baler, and compress the hay into bales. The present machine advances along the windrow and hence eliminates air blowing of the hay, which normally takes place when a stationary baler is employed. The instant machine produces a bale of hay of approximately 12 by 12 by 24 inches weighing approximately one hundred pounds. A piece of cardboard 12 inches square is placed in each end of the bale and the baling wires run longitudinally around the bale and cardboard. Thus, upon storage, the tendency of the bale to ravel is largely overcome.

The machine is comparatively simple in operation and rugged in construction to withstand the uses to which it is subjected. Again, the mechanism is positive of operation and control and produces a uniform product.

Reference is made to the application of A. Kenneth Anderson for Compressed Chopped Forage Bale and Method of Producing Same, Serial No. 201,571, filed December 19, 1950.

Other objects of the present invention will become apparent upon reading the following specification and referring to the accompanying drawings in which similar characters of reference represent corresponding parts in each of the several views.

In the drawings:

Fig. 1 is a top plan of the machine.
Fig. 2 is a vertical section along the line 2—2 of Fig. 1.
Fig. 3 is a side elevation.
Fig. 4 is a rear elevation.
Fig. 5 is a vertical section through the baling mechanism.
Fig. 6 is a perspective of a bale produced by the machine.
Fig. 7 is a horizontal section taken substantially along the line 7—7 of Fig. 5.

Description of baler

The instant machine is incorporated with a hay chopper and pickup 20, such as that disclosed in Saeberlich Patents Nos. 2,196,645 and 2,271,957. The device disclosed in the first of said patents has been modified in that said chopper and pickup 20 is pivotally mounted to the main frame of the machine and supported by springs 15 connected at one end to the chopper and at the other end to rods 16 attached to the main frame so that, as the device is drawn through the field, it will conform to the ground level, there being a roller 17 at the front of the chopper which raises and lowers the machine so that it follows the ground level. The chopper may be adjusted as to degree of fineness, but it is desirable that a very fine adjustment be used.

The details of the chopper form no part of the instant invention. However, it may be stated that the chopper and pickup 20 is contained in a sub-frame 121 extending forwardly from the front of the machine and supported at the forward end by a skid 122 and roller 17. A plurality of pickup fingers 123 is connected to a chain 124, the pickup fingers 123 extending outwardly through slots 126 in the front apron 127 of the machine. The fingers 123 raise the hay from the ground and carry it upward over the front end of the apron 127. A cleated, continuous conveyer 128 is located on the sub-frame 121 so that its upper stretch moves to the left as viewed in Fig. 2. The hay is kept in contact with the conveyer 128 by means of roller wheel 129 which is mounted on the outer end of an arm 131 suitably pivotally mounted on the frame. Feeding reel 132 moves the hay rearwardly and is assisted by auxiliary feeder reel 133 which in turn feeds the hay into cutter cylinder 134 which cooperates with stationary knives (not shown) to chop the hay into proper size.

The chopped hay is deposited at the bottom of an upwardly and sidewardly inclined conveyor tube 21, having an auger type screw 22 therein which lifts the chopped hay and drops it into a hopper 23 at the side of the machine. Hopper 23 is rectangular in cross-section with downwardly converging sides, and there is a rotary agitator 24 near the bottom of the hopper, the axis of rotation thereof being disposed longitudinally of the machine, said agitation is driven from the main motor of the machine by any convenient means. Immediately below hopper 23 is horizontally-disposed baling form 26, one foot square in cross-section having an aperture 27 at the top through which the hay in the hopper discharges. Within the baling form is a reciprocatory ram 28 having a stroke such that in its retracted position (see Fig. 5), it is approximately 12 inches forwardly of the hopper discharge aperture 27 and having a protracted position such as to push bales of hay entirely out of the open rear end of form 26. Said ram is hydraulically driven, by means of an hydraulic cylinder 54 which is actuated and controlled through lines 57 and 58.

In order that ram 28 may reciprocate in the form 26 without binding, a pair of vertically disposed plates 91 are fixed to the square ram head 33, said plates forwardly extending along the sides of form 26. Said plates 91 at their forward ends may be shaped to form an elongated triangular portion 86. It will further be noted that each of the plates 91 is provided with six rollers which engage the sides, top and bottom of form 26. One roller 92 having a horizontal axis and engaging the top of form 26 is located near the rearward end of each plate 91 adjacent head 33; another roller 93 is located on a horizontal axis adjacent the forward end of portion 86 engaging the top side of form 26; roller 94, having a horizontal axis and engaging the bottom of form 26, is located on plate 91 adjacent head 33; roller 96, having a horizontal axis and also engaging the bottom of form 26, is located on plate 91 forwardly of roller 94. Similarly, a pair of rollers 97 having vertical axes and engaging the sides of form 26 is located on each of plates 91. Rollers 92 to 97, inclusive, on each of plates 91 provide for free reciprocation of ram 28 in the interior of form 26. Further it will be noted that head 33 is pivotally connected to ram 28, by means of pivot 98, likewise to prevent binding of head 33 in form 26. At the rearward end of form 26 is gate 29 which closes off said rearward end. Said gate is hinged to the top of form 26 by hinges 31 and held closed by a latch 32 pivoted to the bottom of the form. When a bale has been completed, the operator depresses a pedal 30a which releases latch 32 and allows the gate 29 to be pushed open by the hay moving outwardly. After the bale has been discharged, the gate 29 closes by gravity and is latched by gravity.

A horizontal plate 99 slidable along the underside of the top of form 26 and connected for movement with plates 91 is provided to close off aperture 27 when ram 28 is protracted to prevent hay from discharging from hopper 23 on the wrong side of ram 28.

The forward end of ram 28 has a square head 33 the same size as the interior of form 26, and extending across the face of said plate are two horizontal grooves 34, through which baling wire 42 may be inserted. The inner face of gate 29 is provided with two similar grooves 30 for insertion of baling wires. Insertion of the wire is performed through two narrow elongated slots 36 extending back from the end of the form on either side thereof for a distance of about 24 inches (which is the length of the bale produced). In the top of the form near the outer end thereof is a transverse slot 37 through which a piece of cardboard 41 may be inserted and a vertical slot 38 is formed in one of the sides of the form about 24 inches back from the end thereof through which another piece of carboard 41 may be inserted. These cardboards 41 are designed for use at each end of the bale to maintain the shape thereof. (See Fig. 6.) The baling wire 42 goes around the ends of the bale. and also around the cardboards 41.

*Operation of baler*

In operation only three attendants are required; one operating the tractor drawing the implement, and one at each side of the form 26, the latter two functioning to insert the cardboards 41 and insert and tie the baling wires 42. The implement is tractor drawn along a windrow of cut hay, it being understood that there is sufficient hay in each windrow to keep the machine in operation substantially constantly. The hay is picked up by the chopper 20, chopped into small pieces about ½ inch in length, conveyed to hopper 23 by screw 22 and continuously agitated by agitator 24.

Assuming that the ram 28 has retracted to the position shown in Fig. 5, a substantial quantity of hay is moved through hopper aperture 27 into form 26. One of the operators inserts a cardboard 41 through slot 37 and the ram is reciprocated.

Reciprocation of ram 28 is continued until a bale of the desired length is produced, approximately six strokes usually being sufficient. Just before the last stroke, one of the operators inserts a cardboard through slot 38, said cardboard being pushed against the end of the bale by head 33. The operators stop ram 28 and insert baling wire 42 from one side of the form 26 through one of the slots 30, bend the wire around the opposite side and insert the same through the forward end of slot 36 and slots 34 in head 33 and bring the end of the wire out through the side of form 26 from which it was originally inserted. The operator then takes the two ends of baling wire 42 and ties same together. It will be noted that two wires 42 are used and slots 36 are used to permit the wire to engage the sides of the bale. After the bales are formed, the operator presses pedal 30a which unlatches latch 32, lever 88 is adjusted to move ram 28 rearwardly to push the bale of hay out of form 26.

The bale of hay produced in the machine described above is shown in Fig. 6. It is approximately 12 inches square in cross-section and 24 inches long. Square pieces of cardboard 41 are provided at each end and two baling wires 42 extend longitudinally of the bale around said cardboards. The cardboards function to prevent hay from falling out of the ends of the bales.

Although the present invention has been described in some detail by way of illustration and example for purposes of clarity of understanding, it is understood that certain changes and modifications may be made within the spirit of the invention and scope of the appended claim.

We claim:

A hay baler comprising a hollow baling form, a tail gate at one end of said form, a ram reciprocable in said form, means for reciprocating said ram, a hopper for hay above said form, said form being apertured remote from said tail gate to receive the hay discharged from said hopper, said form having a plurality of longitudinally extending narrow slots for baling wire in opposed sides of said form extending from a zone beneath said hopper and terminating at said one end of said form adjacent said tail gate, said tail gate having a plurality of slots extending cross the inner face thereof, and said ram having a plurality of slots extending across the working face thereof, corresponding slots of said form, said gate and said ram face being included within substantially parallel planes, and said form having wall portions provided with two narrow slots opening therethrough each slot having the longer dimension thereof disposed in a plane transverse to the direction of movement of said ram, one of said last-named slots being situated adjacent said tail gate and the other of said last-named slots being situated remote from said tail gate and beyond said hopper, said last named slots being adapted to receive cardboards insertable therethrough into said form for covering the ends of a bale being produced in said form.

References Cited in the file of this patent

UNITED STATES PATENTS

| | | |
|---|---|---|
| 247,095 | Minear | Sept. 13, 1881 |
| 403,498 | Williams | May 14, 1889 |
| 850,105 | Spencer | Apr. 9, 1907 |
| 876,037 | Bingham | Jan. 7, 1908 |
| 893,830 | Young | July 21, 1908 |
| 1,032,783 | Shaw | July 16, 1912 |
| 1,182,369 | Haniquet | May 9, 1916 |
| 1,197,532 | North | Sept. 5, 1916 |
| 1,290,203 | Hauk | Jan. 7, 1919 |
| 2,037,039 | Ott | Apr. 14, 1936 |
| 2,068,886 | MacDonald | Jan. 26, 1937 |
| 2,196,645 | Saiberlich | Apr. 9, 1940 |
| 2,253,617 | Griffith | Aug. 26, 1941 |
| 2,294,929 | Openshaw | Sept. 8, 1942 |
| 2,396,720 | Nolt | Mar. 19, 1946 |
| 2,476,672 | Martin | July 19, 1949 |
| 2,565,422 | Edwards | Aug. 21, 1951 |
| 2,576,784 | Dodds | Nov. 27, 1951 |